United States Patent
Lin et al.

(10) Patent No.: US 10,910,943 B1
(45) Date of Patent: Feb. 2, 2021

(54) BIDIRECTIONAL POWER FACTOR CORRECTION MODULE

(71) Applicant: DELTA ELECTRONICS, INC., Taoyuan (TW)

(72) Inventors: Hung-Chieh Lin, Taoyuan (TW); Chao-Li Kao, Taoyuan (TW); Yi-Ping Hsieh, Taoyuan (TW); Jin-Zhong Huang, Taoyuan (TW); Chao-Lung Kuo, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 16/675,474

(22) Filed: Nov. 6, 2019

(30) Foreign Application Priority Data

Aug. 14, 2019 (CN) .......................... 2019 1 0748905

(51) Int. Cl.
*H02M 1/42* (2007.01)

(52) U.S. Cl.
CPC ......... *H02M 1/425* (2013.01); *H02M 1/4208* (2013.01); *H02M 1/4233* (2013.01); *H02M 1/4266* (2013.01)

(58) Field of Classification Search
CPC .... H02M 1/42; H02M 1/4208; H02M 1/4225; H02M 1/425; H02M 1/4233; H02M 1/4266
See application file for complete search history.

(56) References Cited

U.S. PATENT DOCUMENTS

| | | | | |
|---|---|---|---|---|
| 7,595,613 | B2* | 9/2009 | Thompson | H02M 1/4208 323/223 |
| 2011/0201898 | A1* | 8/2011 | Benco | G16H 40/67 600/300 |
| 2014/0268959 | A1* | 9/2014 | Frohman | H02M 7/797 363/98 |
| 2015/0162822 | A1* | 6/2015 | Ho | H02M 1/4208 363/89 |
| 2015/0280548 | A1* | 10/2015 | Shoyama | H02M 1/4233 363/126 |
| 2015/0365003 | A1* | 12/2015 | Sadwick | H02M 3/28 363/21.01 |
| 2017/0294833 | A1* | 10/2017 | Yang | H01F 27/2804 |

(Continued)

OTHER PUBLICATIONS

Su et al. "An Interleaved Totem-Pole Boost Bridgeless Rectifier With Reduced Reverse-Recovery Problems for Power Factor Correction," Jun. 2010, IEEE Transactions on Power Electronics, vol. 25, No. 6. pp. 1406-1415. (Year: 2010).*

(Continued)

*Primary Examiner* — Jeffrey A Gblende
*Assistant Examiner* — Kevin H Sprenger
(74) *Attorney, Agent, or Firm* — Muncy, Geissler, Olds & Lowe, P.C.

(57) ABSTRACT

A bidirectional power factor correction (PFC) module is coupled to an AC power source, an energy storage unit, and a DC bus. The bidirectional PFC module includes a bridge arm assembly and a control unit. The bridge arm assembly includes a first bridge arm, a first inductor, a second inductor, and a second bridge arm. The control unit provides a plurality of control signals to control the first bridge arm and the second bridge arm to make the bidirectional PFC module operate in an AC power supply mode, a DC power supply mode, or a power feed mode.

15 Claims, 17 Drawing Sheets

(56) References Cited

U.S. PATENT DOCUMENTS

2018/0115256 A1* 4/2018 Ho .................. H02M 7/217
2019/0267827 A1* 8/2019 He .................. H02J 7/342

OTHER PUBLICATIONS

Lin et al. "Three-phase AC/DC Converter with High Power Factor," May 2005, IEE Proceedings—Electric Power Applications, vol. 152, No. 3., pp. 757-764. (Year: 2005).*

* cited by examiner

BIDIRECTIONAL POWER FACTOR CORRECTION MODULE

BACKGROUND

Technical Field

The present disclosure relates to a bidirectional power factor correction module, and more particularly to a bidirectional power factor correction module with two inductors.

Description of Related Art

The statements in this section merely provide background information related to the present disclosure and do not necessarily constitute prior art.

FIG. 1 shows a block circuit diagram of a conventional bidirectional power factor correction (PFC) system. The bidirectional PFC system 1' includes a DC-to-DC converter A, a bidirectional PFC module 100', a DC bus 300, and an inverter unit 400. The bidirectional PFC module 100' includes a bridge arm assembly 10' and a control unit 20'. The bridge arm assembly 10' is coupled to an energy storage unit 200 through the DC-to-DC converter A, and coupled to the inverter unit 400 through the DC bus 300. When an AC power source Vac is normal, the control unit 20' controls the bridge arm assembly 10' to convert the AC power source Vac to a bus voltage Vbus, and then provide energy of the bus voltage Vbus to the inverter unit 400. When the AC power source Vac is abnormal, the DC-to-DC converter A converts energy of the energy storage unit 200 to a bus voltage Vbus. Due to the requirement of regulation of the bus voltage Vbus and the third harmonic leakage current on the DC bus 300, the power flow can be effectively adjusted by using the bidirectional PFC system 1'.

However, the conventional bidirectional PFC module 100' is a structure having a single inductor L, and the inductor L is not in the main current path of the energy storage unit 200. Therefore, the energy storage unit 200 supplies energy through the DC-to-DC converter A. This results in a low power density of the entire circuit system, high circuit cost, and the inability to reduce the size of the circuit.

Therefore, how to design a bidirectional PFC module, using a special circuit structure design of dual inductors to integrate the conventional DC-to-DC converter and the conventional bidirectional PFC module to significantly increase the power density of the circuit system, reduce circuit cost, and reduce circuit size are important topics for the inventors of the present disclosure.

SUMMARY

In order to solve the above-mentioned problems, the present disclosure provides a bidirectional power factor correction (PFC) module. The bidirectional PFC module is coupled to an AC power source, an energy storage unit, and a DC bus. The DC bus has series-connected a first capacitor and a second capacitor. The bidirectional PFC module includes a bridge arm assembly and a control unit. The bridge arm assembly includes a first bridge arm, a first inductor, a second inductor, and a second bridge arm. The first bridge arm includes series-connected a first switch assembly, a second switch assembly, a third switch assembly, and fourth switch assembly. The first switch assembly is coupled to the first capacitor, the fourth switch assembly is coupled to the second capacitor, and the second switch assembly and the third switch assembly are coupled to the AC power source, the first capacitor, and the second capacitor. The first inductor is coupled to the first switch assembly and the second switch assembly. The second inductor is coupled to the third switch assembly and the fourth switch assembly. The second bridge arm includes series-connected a fifth switch assembly and a sixth switch assembly. The AC power source is coupled to the fifth switch assembly and the sixth switch assembly, the fifth switch assembly is coupled to the first inductor and the energy storage unit, and the sixth switch assembly is coupled to the second inductor and the energy storage unit. The control unit provides a plurality of control signals to control the bridge arm assembly so that the bridge arm assembly operate in an AC power supply mode, a DC power supply mode, or a power feed mode.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Figure 1:
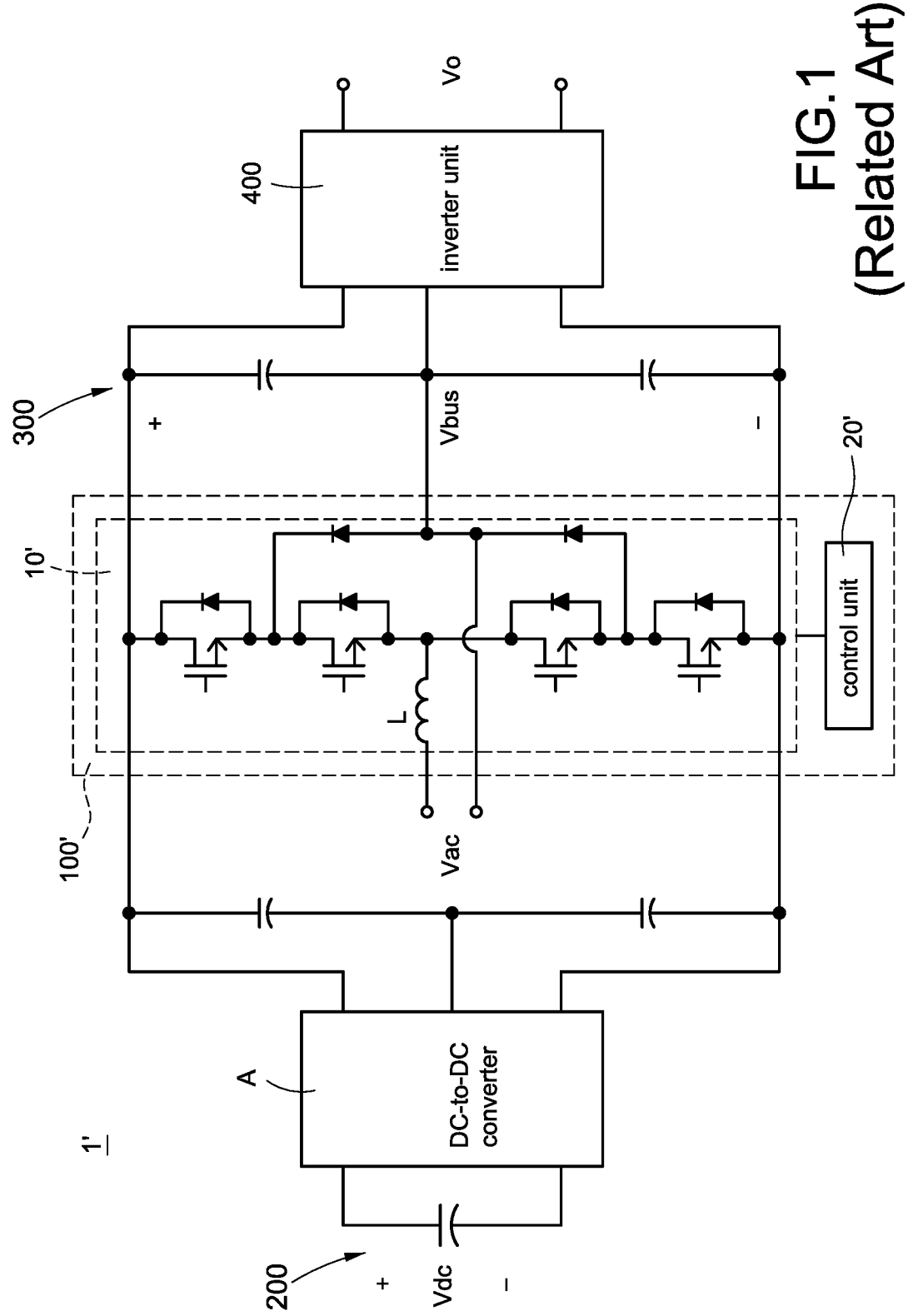
FIG. 1 is a block circuit diagram of a conventional bidirectional power factor correction (PFC) system.

Reference will now be made to the drawing figures to describe the present disclosure in detail. It will be understood that the drawing figures and exemplified embodiments of present disclosure are not limited to the details thereof.

Figure 2:
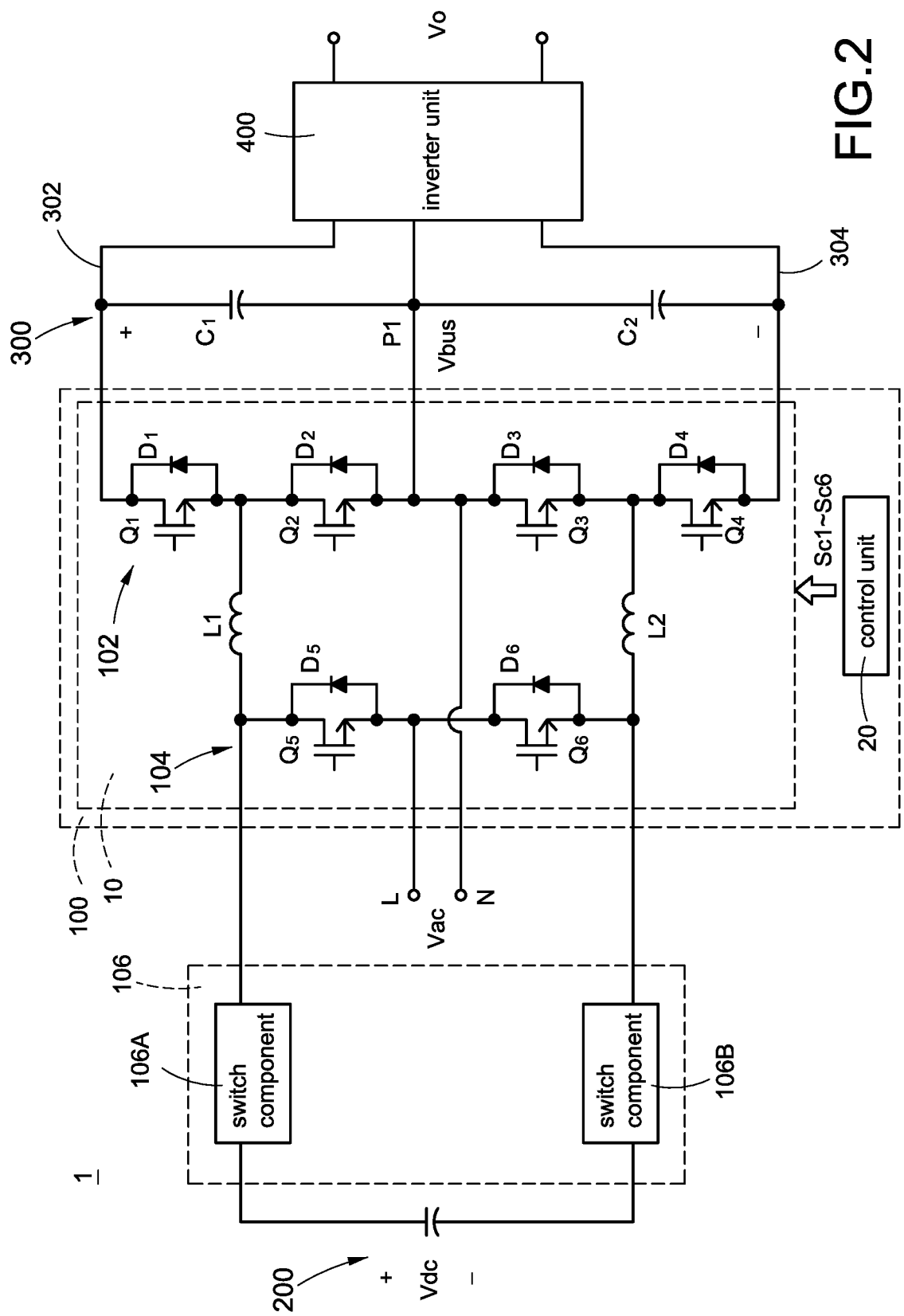
FIG. 2 is a block circuit diagram of a bidirectional PFC system according to the present disclosure.

Please refer to FIG. 2, which shows a block circuit diagram of a bidirectional power factor correction (PFC) system according to the present disclosure. Take a single-phase AC power source for example, the bidirectional PFC system 1 includes a bidirectional PFC module 100, an energy storage unit 200, a DC bus 300, and an inverter unit 400. The bidirectional PFC module 100 includes a bridge arm assembly 10 and a control unit 20. The bridge arm assembly 10 is coupled to the energy storage unit 200, the DC bus 300, and coupled to the AC power source Vac through a live wire L and a neutral wire N. The DC bus 300 includes series-connected a first capacitor C1 and a second capacitor C2. One end of the first capacitor C1 is a bus positive terminal 302 of the DC bus 300 and one end of the second capacitor C2 is a bus negative terminal 304 of the DC bus 300, and a contact between the first capacitor C1 and the second capacitor C2 is a first middle point P1. The inverter unit 400 provides an output power source Vo and coupled to the bus positive terminal 302, the bus negative terminal 304, and the first middle point P1 of the DC bus 300. The control unit 20 provides a plurality of control signals Sc1-Sc6 to control the bridge arm assembly 10 so that the bridge arm assembly 10 operates in an AC power supply mode, a DC power supply mode, or a power feed (reverse) mode.

Specifically, the bridge arm assembly 10 includes a first bridge arm 102, a first inductor L1, a second inductor L2, and a second bridge arm 104. The first bridge arm 102 includes sequentially series-connected a first switch assembly Q1, a second switch assembly Q2, a third switch assembly Q3, and a fourth switch assembly Q4. The first switch assembly Q1 is coupled to the first capacitor C1 through the bus positive terminal 302, the fourth switch assembly Q4 is coupled to the second capacitor C2 through the bus negative terminal 304, and the second switch assembly Q2 and the third switch assembly Q3 are coupled to the first middle point P1 and coupled to the AC power source Vac through the neutral wire N. One end of the first inductor L1 is coupled to a contact between the first switch assembly Q1 and the second switch assembly Q2, and one end of the second inductor L2 is coupled to a contact between the third switch assembly Q3 and the fourth switch assembly Q4.

The second bridge arm 104 includes sequentially series-connected a fifth switch assembly Q5 and a sixth switch assembly Q6. The fifth switch assembly Q5 and the sixth switch assembly Q6 are coupled to the AC power source Vac through the live wire L. The fifth switch assembly Q5 is coupled to the other end of the first inductor L1, and the sixth switch assembly Q6 is coupled to the other end of the second inductor L2. In particular, each of the first switch assembly Q1, the second switch assembly Q2, the third switch assembly Q3, the fourth switch assembly Q4, the fifth switch assembly Q5, and the sixth switch assembly Q6 may be an IGBT or MOSFET having an anti-parallel diode D1-D6. The anti-parallel diode D1-D6 may be a body diode inside the switch transistor or a separate diode. In the present disclosure, each of the switch assemblies has a feature of bidirectional conduction. The control unit 20 provides a plurality of control signals Sc1-Sc6 to respectively control the first switch assembly Q1, the second switch assembly Q2, the third switch assembly Q3, the fourth switch assembly Q4, the fifth switch assembly Q5, and the sixth switch assembly Q6 so that the bridge arm assembly 10 operates in the AC power supply mode, the DC power supply mode, or the power feed (reverse) mode.

Further, the AC power supply mode means that the bidirectional PFC module 100 converts the AC power source Vac to the bus voltage Vbus through the bridge arm assembly 10 by the plurality of control signals Sc1-Sc6 provided by the control unit 20 and provide the bus voltage Vbus to the DC bus 300. The DC power supply mode means that the bidirectional PFC module 100 converts the DC power source Vdc provided by the energy storage unit 200 to the bus voltage Vbus through the bridge arm assembly 10 by the plurality of control signals Sc1-Sc6 provided by the control unit 20 and provide the bus voltage Vbus to the DC bus 300. The power feed (reverse) mode means that the bidirectional PFC module 100 converts the bus voltage Vbus to the AC power source Vac through the bridge arm assembly 10 by the plurality of control signals Sc1-Sc6 provided by the control unit 20.

The bidirectional PFC system 1 further includes a switch unit 106 having two switch components 106A,106B. One end of the switch component 106A is coupled to a positive polarity (+) of the energy storage unit 200 and one end of the switch component 106B is coupled to a negative polarity (−) of the energy storage unit 200. The other end of the switch component 106A is coupled to the fifth switch assembly Q5 and the first inductor L1, and the other end of the switch component 106B is coupled to the sixth switch assembly Q6 and the second inductor L2. In one embodiment, each of the switch components 106A,106B may be, for example but not limited to, a silicon controlled rectifier (SCR). In the DC power supply mode, the switch unit 106 (i.e., the two switch components 106A,106B) is turned on so that the DC power source Vdc is converted to the bus voltage Vbus through the bridge arm assembly 10. In the AC power supply mode or the power feed (reverse) mode, the switch unit 106 (i.e., the two switch components 106A,106B) is turned off so that the AC power source Vac fails to generate a current path to the energy storage unit 200 when the fifth switch assembly Q5 or the sixth switch assembly Q6 is turned on. The switch unit 106 can be controlled by control signals (not shown) provided by the control unit 20.

Figure 3A:
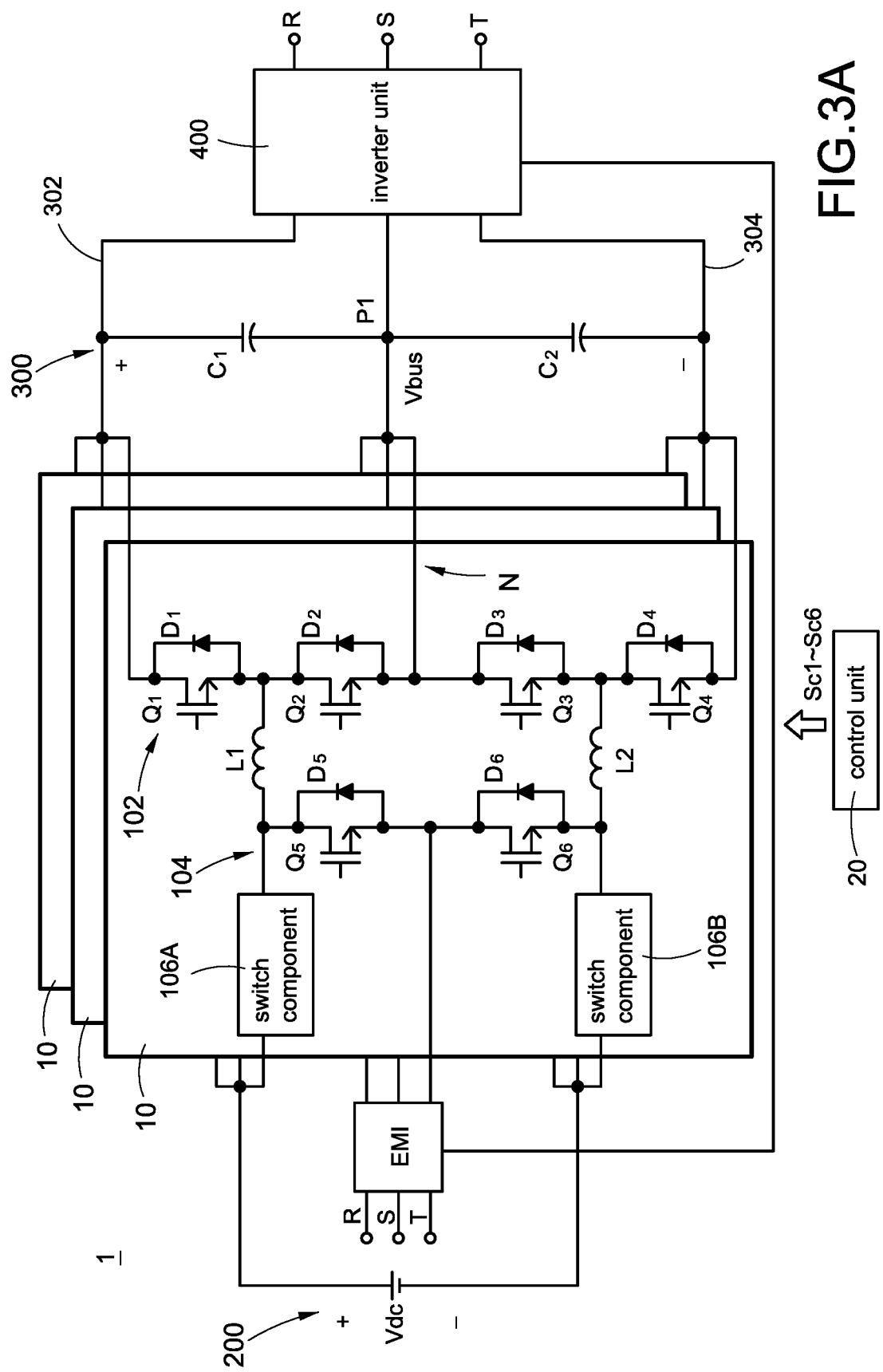
FIG. 3A is a circuit diagram of a bidirectional PFC module applied to a three-phase three-wire structure according to the present disclosure.

Please refer to FIG. 3A, which shows a circuit diagram of a bidirectional PFC module applied to a three-phase three-wire structure according to the present disclosure. In the bidirectional PFC system, the bidirectional PFC module 100 includes three parallel-connected bridge arm assemblies 10. The AC power source Vac and the energy storage unit 200 are coupled to the three bridge arm assemblies 10. The DC bus 300 is connected to the bridge arm assembly 10 and the inverter unit 400 in parallel. The three-phase AC power source Vac or DC power source Vdc is converted to the three-phase AC output power source Vo through the bidirectional PFC module 100, the DC bus 300, and the inverter unit 400. Please refer to FIG. 3B, which shows a circuit diagram of the bidirectional PFC module applied to a three-phase four-wire structure according to the present disclosure. The major difference between FIG. 3B and the FIG. 3A is that the three-phase four-wire bidirectional PFC system 1A in the former further includes a neutral wire. The energy storage unit 200 includes a first energy storage unit 200A and a second energy storage unit 200B. A contact between the first energy storage unit 200A and the second energy storage unit 200B is a second middle point P2, and the second middle point P2 is coupled to the first middle point P1 through the neutral wire N.

Figure 3B:
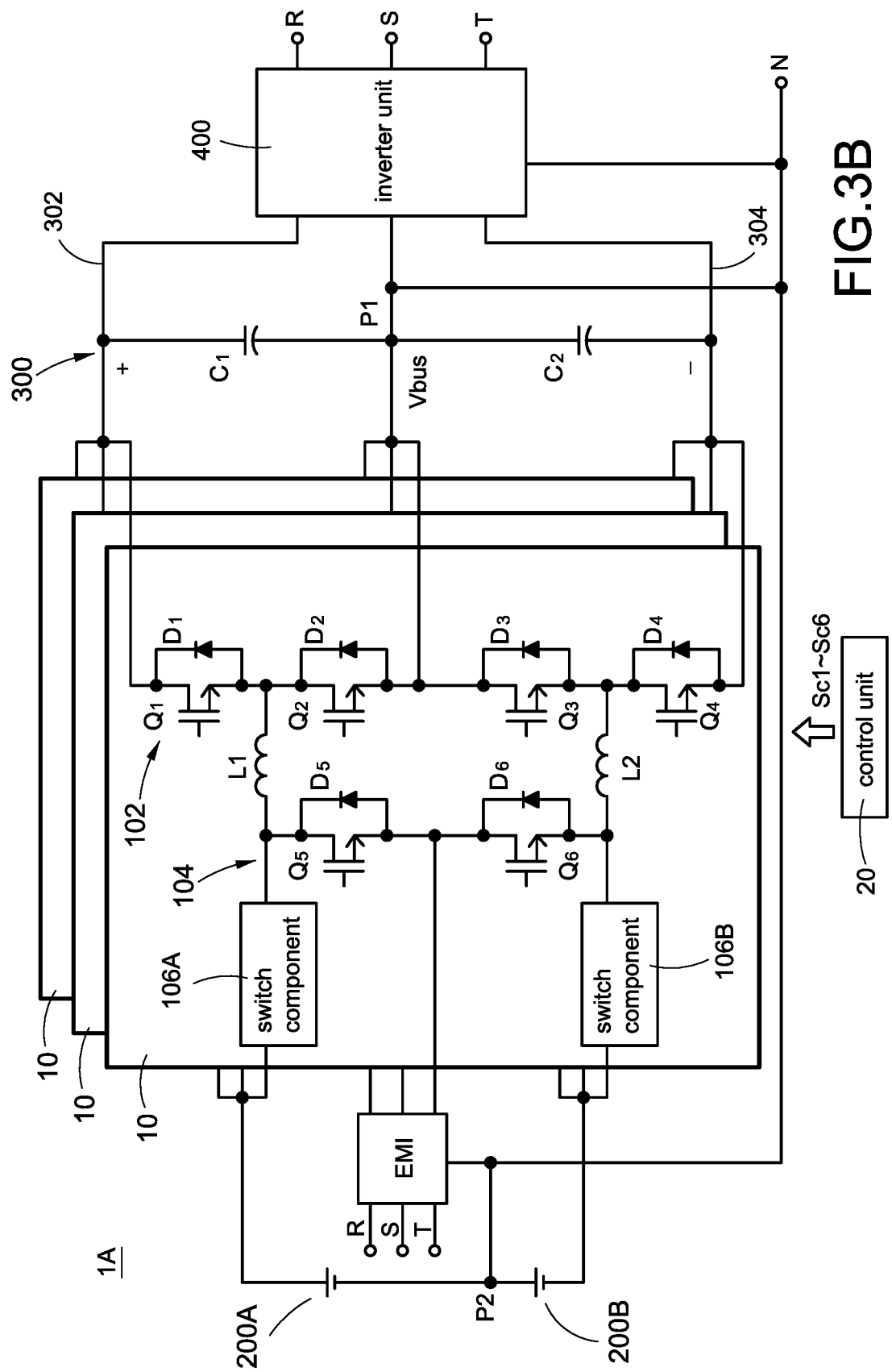
FIG. 3B is a circuit diagram of the bidirectional PFC module applied to a three-phase four-wire structure according to the present disclosure.
Figure 4A:
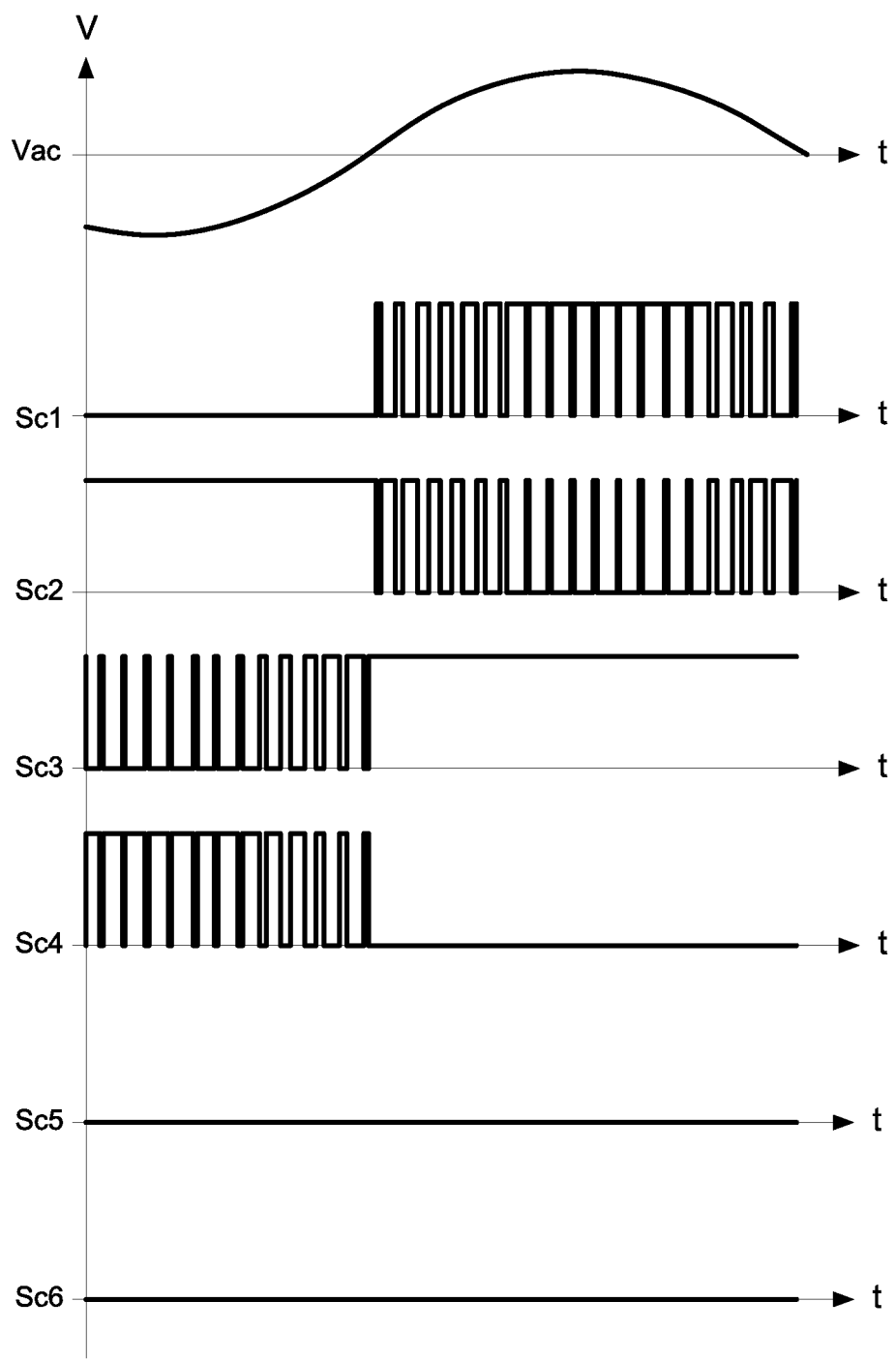
FIG. 4A is a waveform of controlling switches of the bidirectional PFC module in an AC power supply mode according to the present disclosure.

Please refer to FIG. 4A, which shows a waveform of controlling switches of the bidirectional PFC module in an AC power supply mode according to the present disclosure, and also refer to FIG. 2 to FIG. 3B. The first control signal Sc1 provided from the control unit 20 is used to control the first switch assembly Q1, the second control signal Sc2 is used to control the second switch assembly Q2, the third control signal Sc3 is used to control the third switch assembly Q3, the fourth control signal Sc4 is used to control the fourth switch assembly Q4, the fifth control signal Sc5 is used to control the fifth switch assembly Q5, and the sixth control signal Sc6 is used to control the sixth switch assembly Q6. In the AC power supply mode and when the AC power source Vac is in a positive half cycle, the second control signal Sc2 is the main switching signal to control the bridge arm assembly 10 to dominate the energy storage and freewheeling of the first inductor L1. In the AC power supply mode and when the AC power source Vac is in a negative half cycle, the third control signal Sc3 is the main switching signal to control the bridge arm assembly 10 to dominate the energy storage and freewheeling of the second inductor L2.

Specifically, when the AC power source Vac is in the positive half cycle, the second control signal Sc2 is the main switching signal, the fourth control signal Sc4, the fifth control signal Sc5, and the sixth control signal Sc6 are second level signals (i.e., low-level signals), and the three control signal Sc3 is a first level signal or the second level signal. As long as the third control signal Sc3 and the fourth control signal Sc4 are not both the high-level signals. If the fifth control signal Sc5 is the second level signal, the current path of the AC power source Vac is provided by a bypass diode D5. However, the fifth control signal Sc5 may be a first level signal to reduce conduction losses. Further, the first control signal Sc1 and the second control signal Sc2 may be complementary switching signals (as shown in FIG. 4A) to implement the synchronous rectification and increase the efficiency of the bidirectional PFC module 100. Alternatively, the first control signal Sc1 may be the second level signal so that the current flows to the bus positive terminal 302 through a bypass diode D1 of the first switch assembly Q1 or an inner junction diode of the first switch assembly Q1 when the second switch assembly Q2 is turned off. The switch waveform of the AC power source Vac at the negative half cycle is similar to that of the AC power source Vac at the positive half cycle, and will not be described herein. When the bidirectional PFC module 100 is in the AC power supply mode, the second control signal Sc2 and the third control signal Sc3 are main switching signals in the positive half cycle and the negative half cycle, respectively, and other signals can be used to adjust control manners to increase efficiency. A relatively simple control manner is shown in FIG. 4A that the first control signal Sc1 and the second control signal Sc2 are complementary and the third control signal Sc3 and the third control signal Sc4 are complementary, however, it is not limited to this.

Figure 4B:
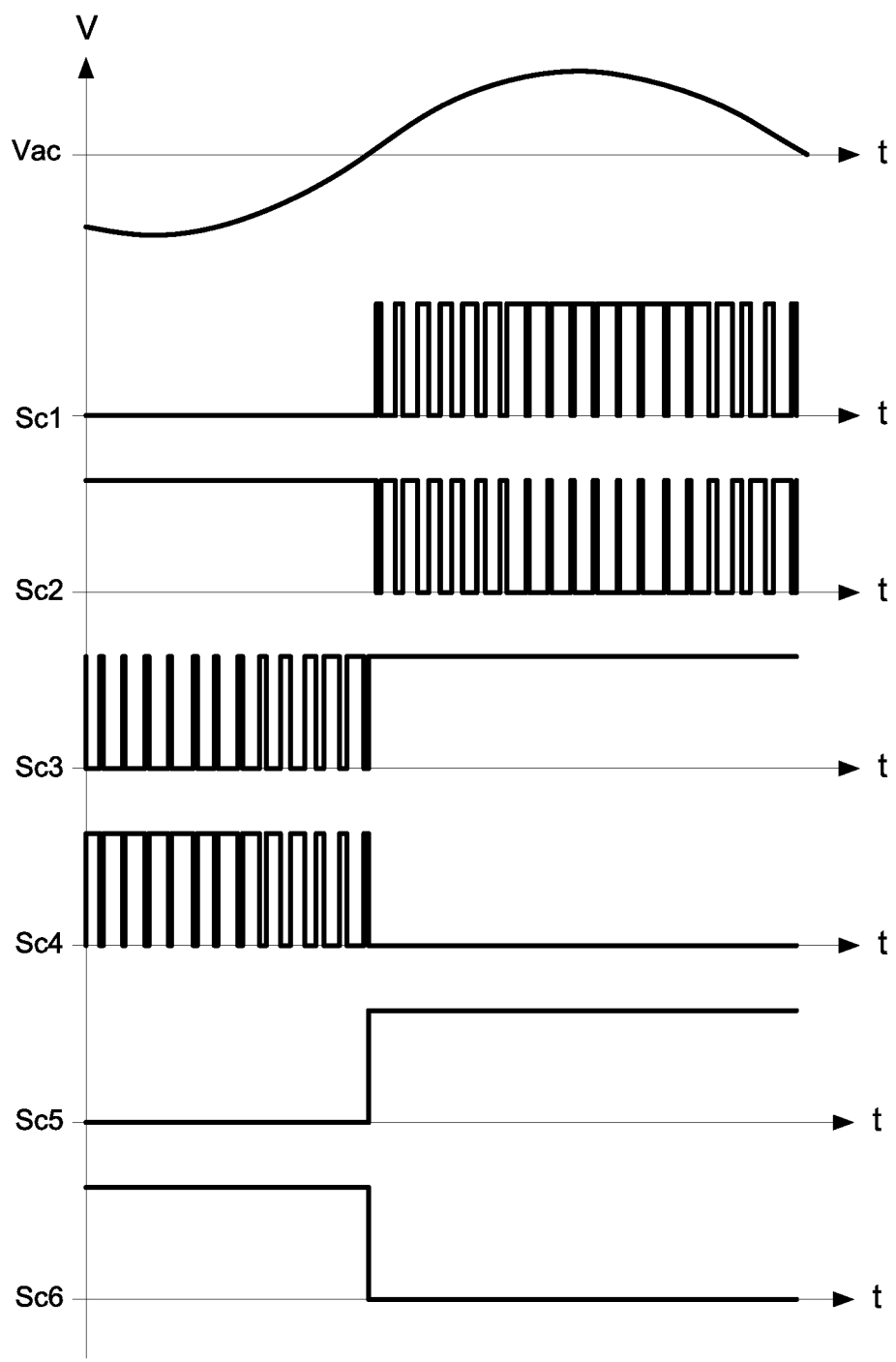
FIG. 4B is a waveform of controlling the switches of the bidirectional PFC module in a power feed mode according to the present disclosure.

Please refer to FIG. 4B, which shows a waveform of controlling the switches of the bidirectional PFC module in a power feed mode according to the present disclosure, and also refer to FIG. 2 to FIG. 4A. In the power feed (reverse) mode and when the AC power source Vac is in a positive half cycle, the first control signal Sc1 is the main switching signal to control the bridge arm assembly 10 to dominate the energy storage and freewheeling of the first inductor L1. In the AC power supply mode and when the AC power source Vac is in the negative half cycle, the fourth control signal Sc4 is the main switching signal to control the bridge arm assembly 10 to dominate the energy storage and freewheeling of the second inductor L2. Specifically, the fifth control signal Sc5 and the sixth control signal Sc6 are controlled as the first level signal (i.e., the high level signal) or the second level signal (i.e., the low level signal) according to the positive half cycle and the negative half cycle of the AC power source Vac. In the positive half cycle of the AC power source Vac, the first control signal Sc1 is the main switching signal and the second control signal Sc2 may be complementary with the first control signal Sc1 (as shown in FIG. 4B), thereby implementing synchronous rectification and increasing the efficiency of the bidirectional PFC module 100. Alternatively, the second control signal Sc2 may be the second level signal so that the current can flow to the first inductor L1 through a bypass diode D2 of the second switch assembly Q2 or an inner junction diode of the second switch assembly Q2 when the first switch assembly Q1 is turned off. The switch waveform of the AC power source Vac at the negative half cycle is similar to that of the AC power source Vac at the positive half cycle, and will not be described herein. When the bidirectional PFC module 100 is in the power feed (reverse) mode, the first control signal Sc1 and the fourth control signal Sc4 are main switching signals in the positive half cycle and the negative half cycle, respectively, the fifth control signal Sc5 and the sixth control signal Sc6 are complementary to feed energy back to the AC power source Vac, and other signals can be used to adjust control manners to increase efficiency. A relatively simple control manner is shown in FIG. 4B that the first control signal Sc1 and the second control signal Sc2 are complementary and the third control signal Sc3 and the third control signal Sc4 are complementary, however, it is not limited to this.

Figure 4C:
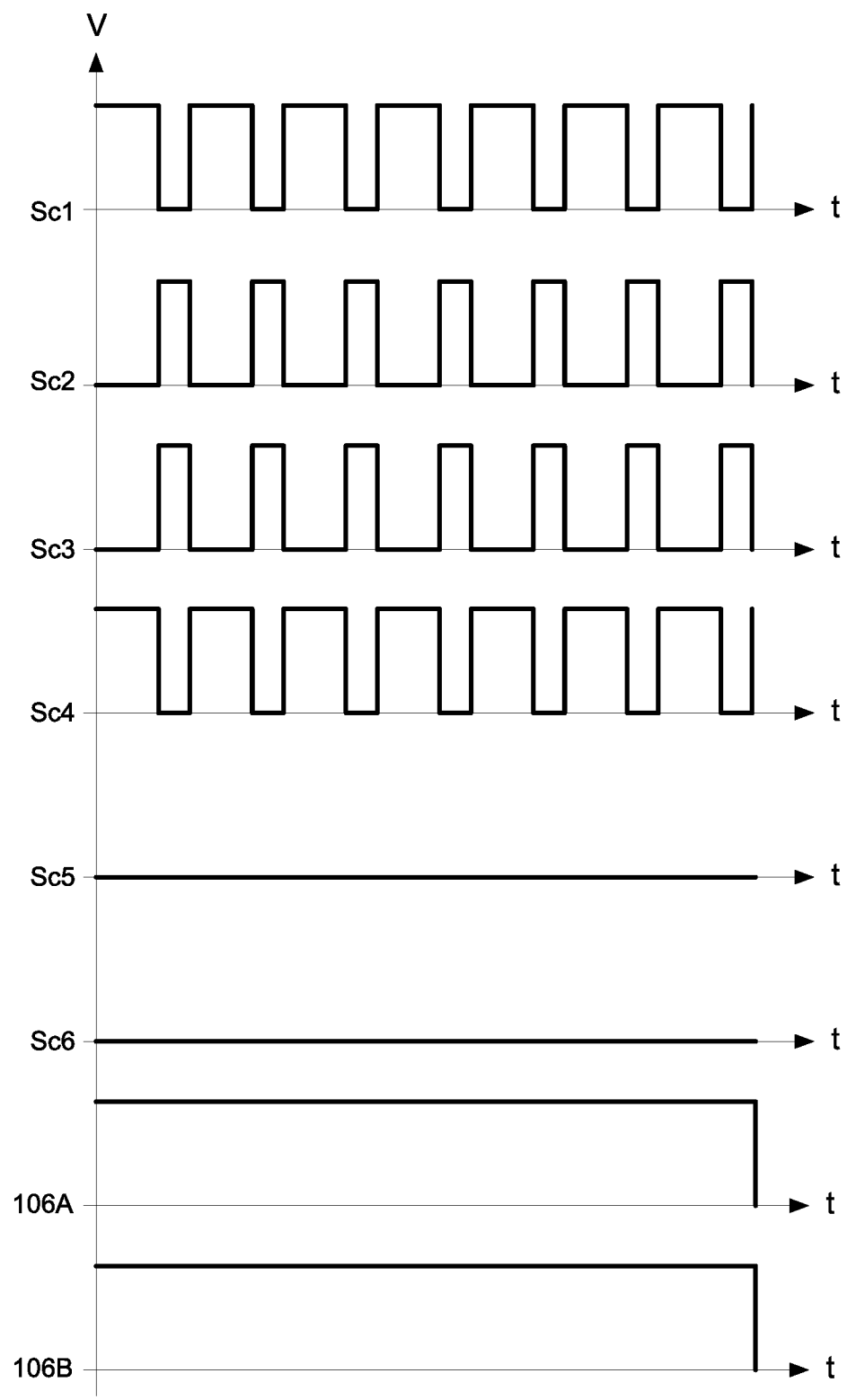
FIG. 4C is a waveform of controlling the switches of the bidirectional PFC module in DC power supply mode according to the present disclosure.

Please refer to FIG. 4C, which shows a waveform of controlling the switches of the bidirectional PFC module in DC power supply mode according to the present disclosure, and also refer to FIG. 2 to FIG. 4B. In the DC power supply mode, the switch components 106A,106B are turned on, and the second control signal Sc2 and the third control signal Sc3 are the main switching signals. The bridge arm assembly 10 is controlled to turn on the second switch assembly Q2 and the third switch assembly Q3 through the second control signal Sc2 and the third control signal Sc3 to form an energy storage path of the first inductor L1 and the second inductor L2. Also, the bridge arm assembly 10 is controlled to turn on the first switch assembly Q1 and the fourth switch assembly Q4 through the first control signal Sc1 and the fourth control signal Sc4 to form a freewheeling path of the first inductor L1 and the second inductor L2. Similarly, the first control signal Sc1 and the fourth control signal Sc4 may be the second level signal (i.e., the low level signal) so that the bypass diode is used to provide the freewheeling path. In the DC power supply mode, the first control signal Sc1 and the second control signal Sc2 may be complementary switching signals, the third control signal Sc3 and the fourth control signal Sc4 may be complementary switching signals, and the fifth control signal Sc5 and the sixth control signal Sc6 may be the second level signals (i.e., the low level signals). In particular, The second control signal Sc2 and the third control signal Sc3 may be the same or different control signals, and the different control signals can adjust voltages of the first capacitor C1 and the second capacitor C2.

Figure 5A:
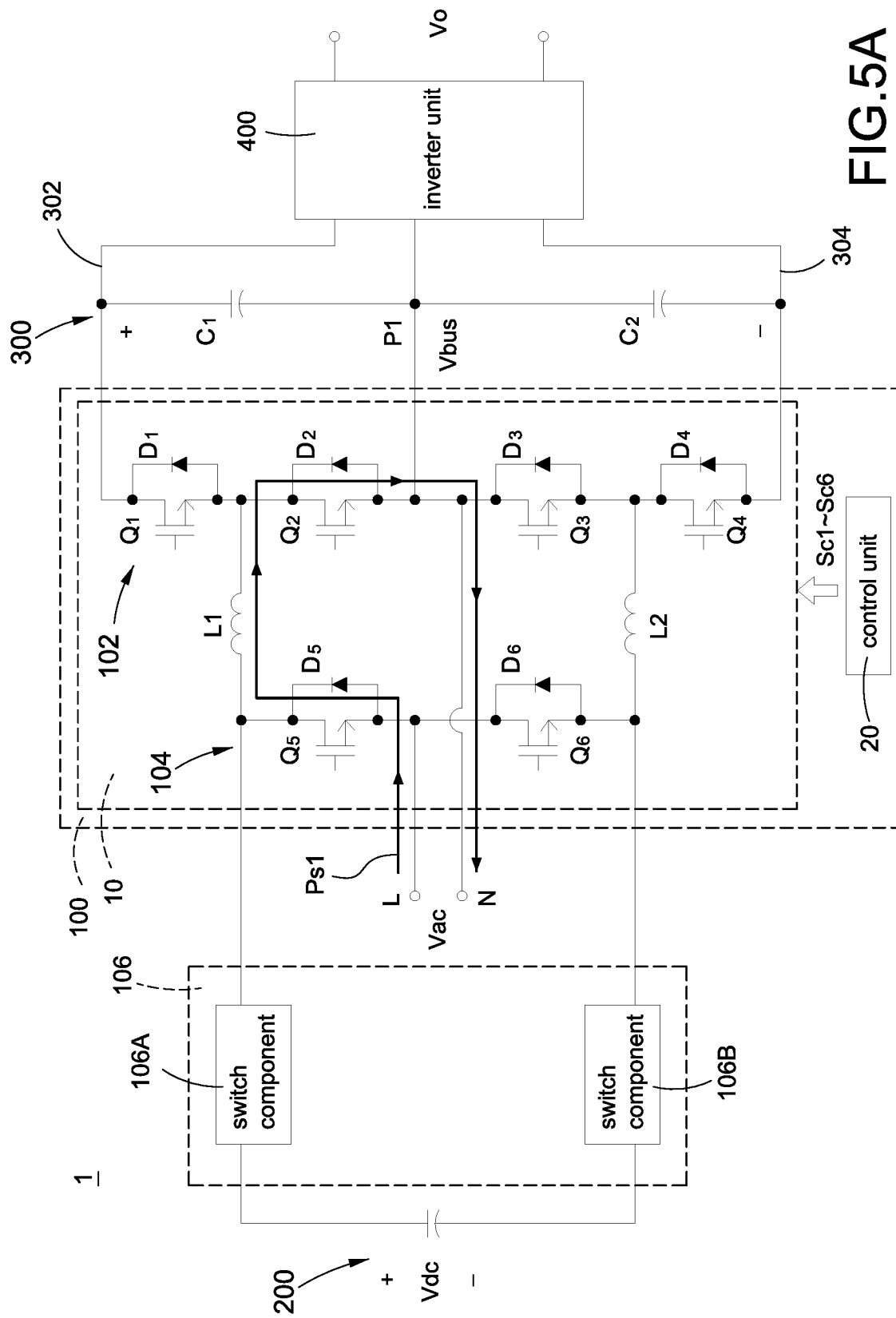
FIG. 5A shows a positive half cycle energy storage path of operating the bidirectional PFC module in the AC power supply mode according to the present disclosure.
Figure 5B:
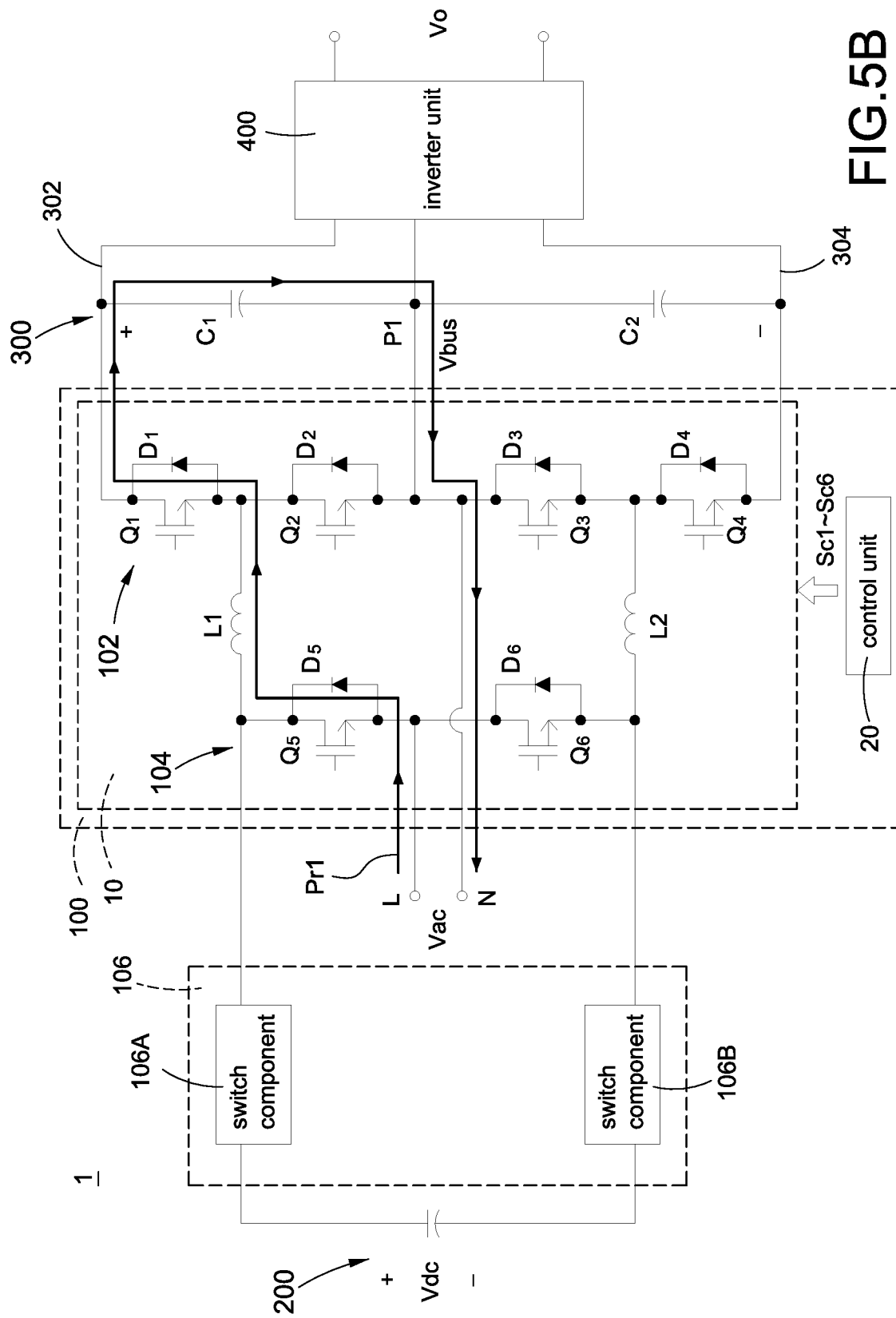
FIG. 5B shows a positive half cycle freewheeling path of operating the bidirectional PFC module in the AC power supply mode according to the present disclosure.
Figure 5C:
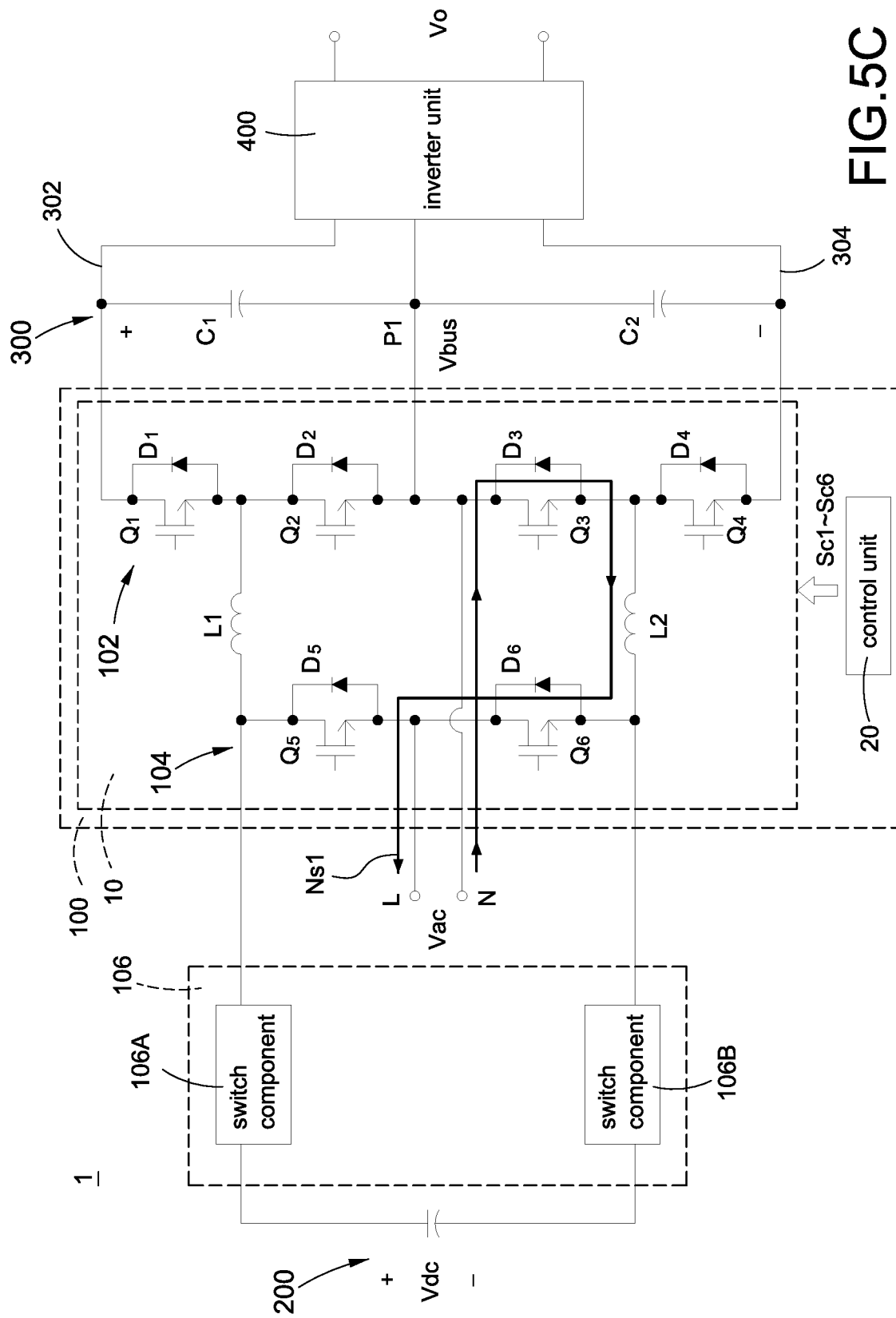
FIG. 5C shows a negative half cycle energy storage path of operating the bidirectional PFC module in the AC power supply mode according to the present disclosure.
Figure 5D:
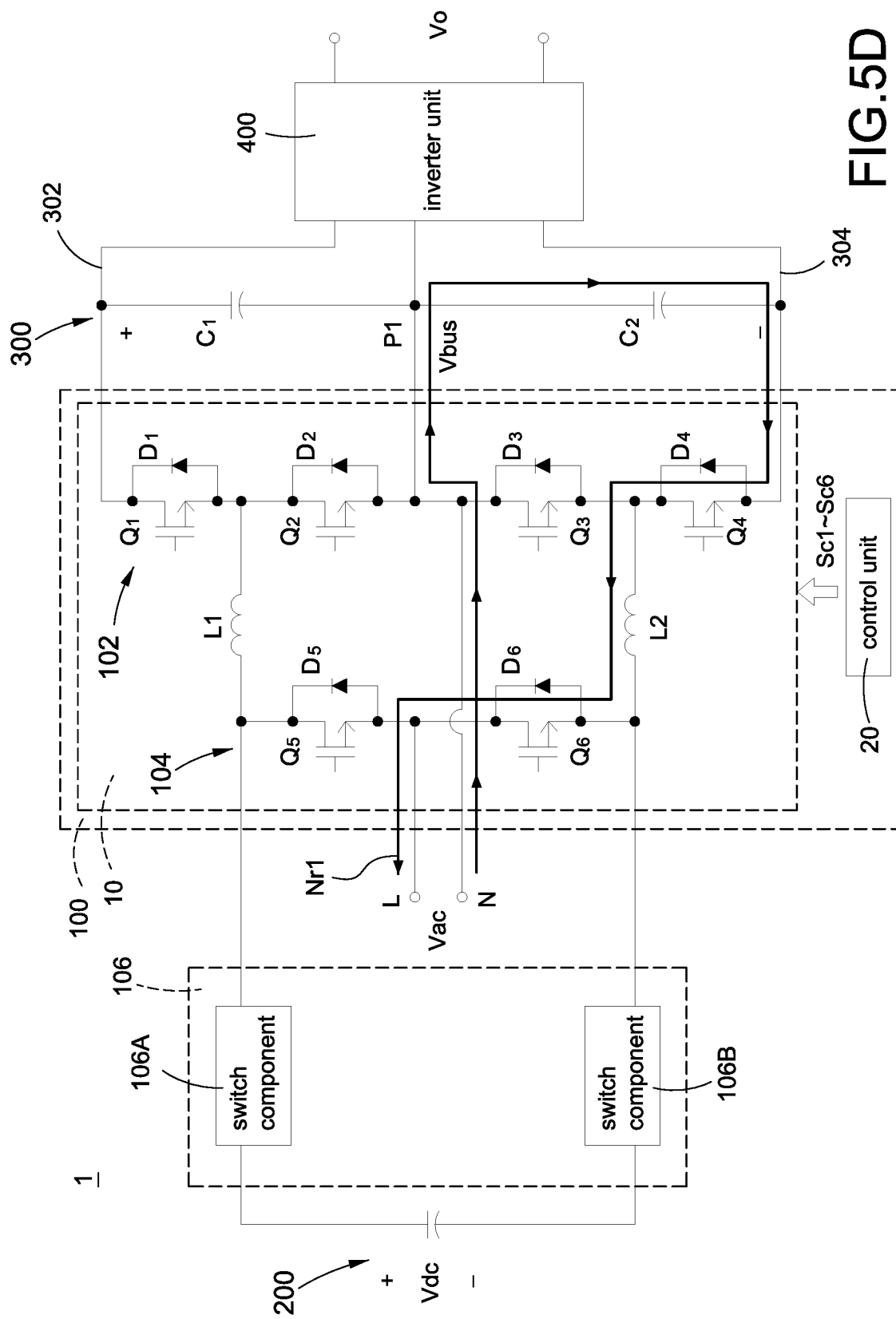
FIG. 5D shows a negative half cycle freewheeling patch of operating the bidirectional PFC module in the AC power supply mode according to the present disclosure.

Please refer to FIG. 5A and FIG. 5B, which show a positive half cycle energy storage path and a positive half cycle freewheeling path of operating the bidirectional PFC module in the AC power supply mode according to the present disclosure, respectively, and also refer to FIG. 2 to FIG. 4C. In FIG. 5A, a positive half cycle energy storage path Psi is formed through the AC power source Vac, the bypass diode D5 of the fifth switch assembly Q5, the first inductor L1, the second switch assembly Q2, and the AC power source Vac. In FIG. 5B, a positive half cycle freewheeling path Pr1 is formed through the AC power source Vac, the bypass diode D5 of the fifth switch assembly Q5, the first inductor L1, the first switch assembly Q1 (or the bypass diode D1 of the first switch assembly Q1), the first capacitor C1, and the AC power source Vac. At this condition, the first capacitor C1 is charged by the first inductor L1 in the freewheeling manner. Please refer to FIG. 5C and FIG. 5D, which show a negative half cycle energy storage path and a negative half cycle freewheeling patch of operating the bidirectional PFC module in the AC power supply mode according to the present disclosure, respectively, and also refer to FIG. 2 to FIG. 5B. In FIG. 5C and FIG. 5D, a negative half cycle energy storage path Ns1 and a negative half cycle freewheeling path Nr1 are formed, respectively. Since the negative half cycle energy storage path Ns1 and the negative half cycle freewheeling path Nr1 are similar to the positive half cycle energy storage path Psi and the positive half cycle freewheeling path Pr1, the detail is omitted here for conciseness.

Figure 6A:
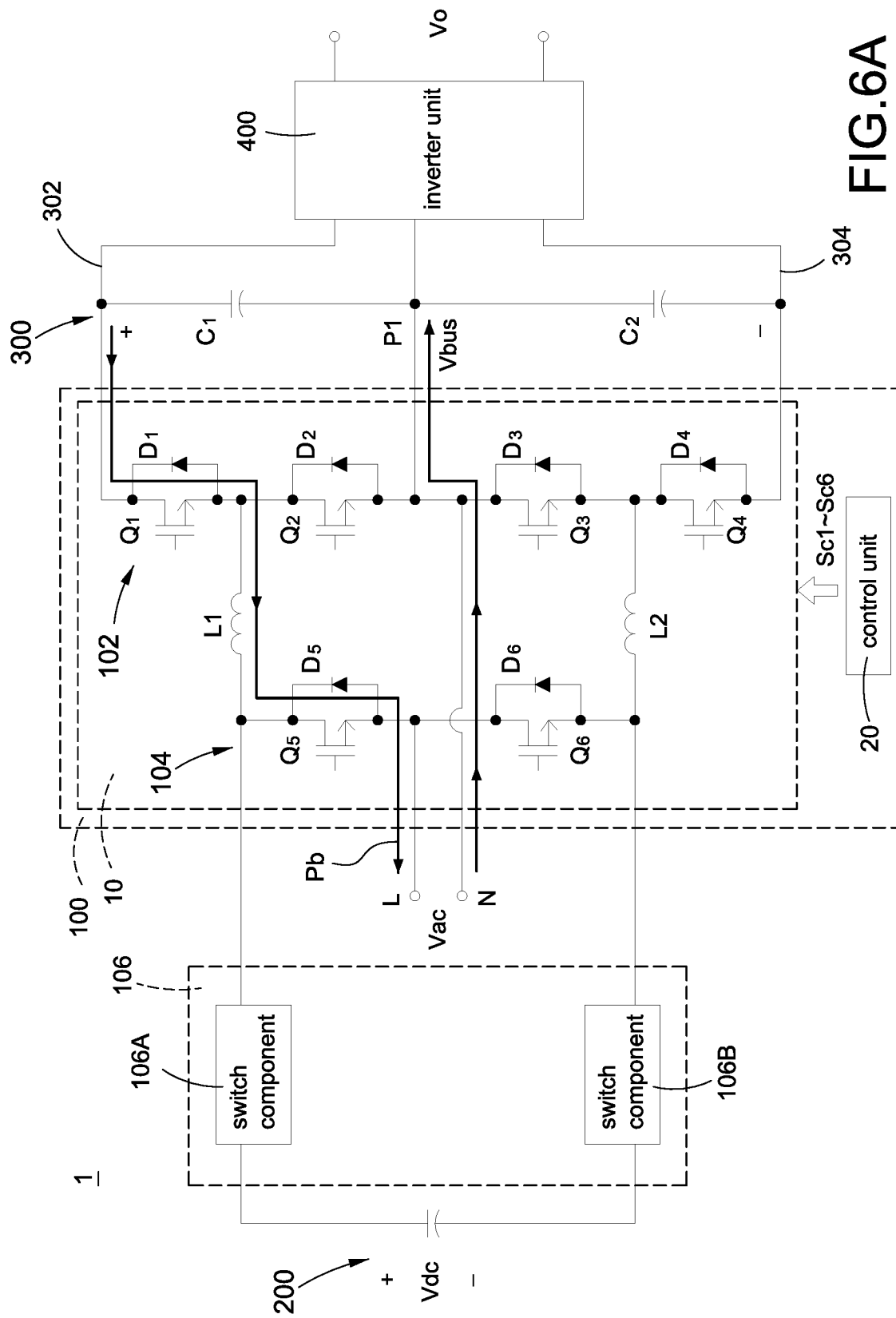
FIG. 6A shows a positive half cycle power feeding path of operating the bidirectional PFC module in the power feed mode according to the present disclosure.
Figure 6B:
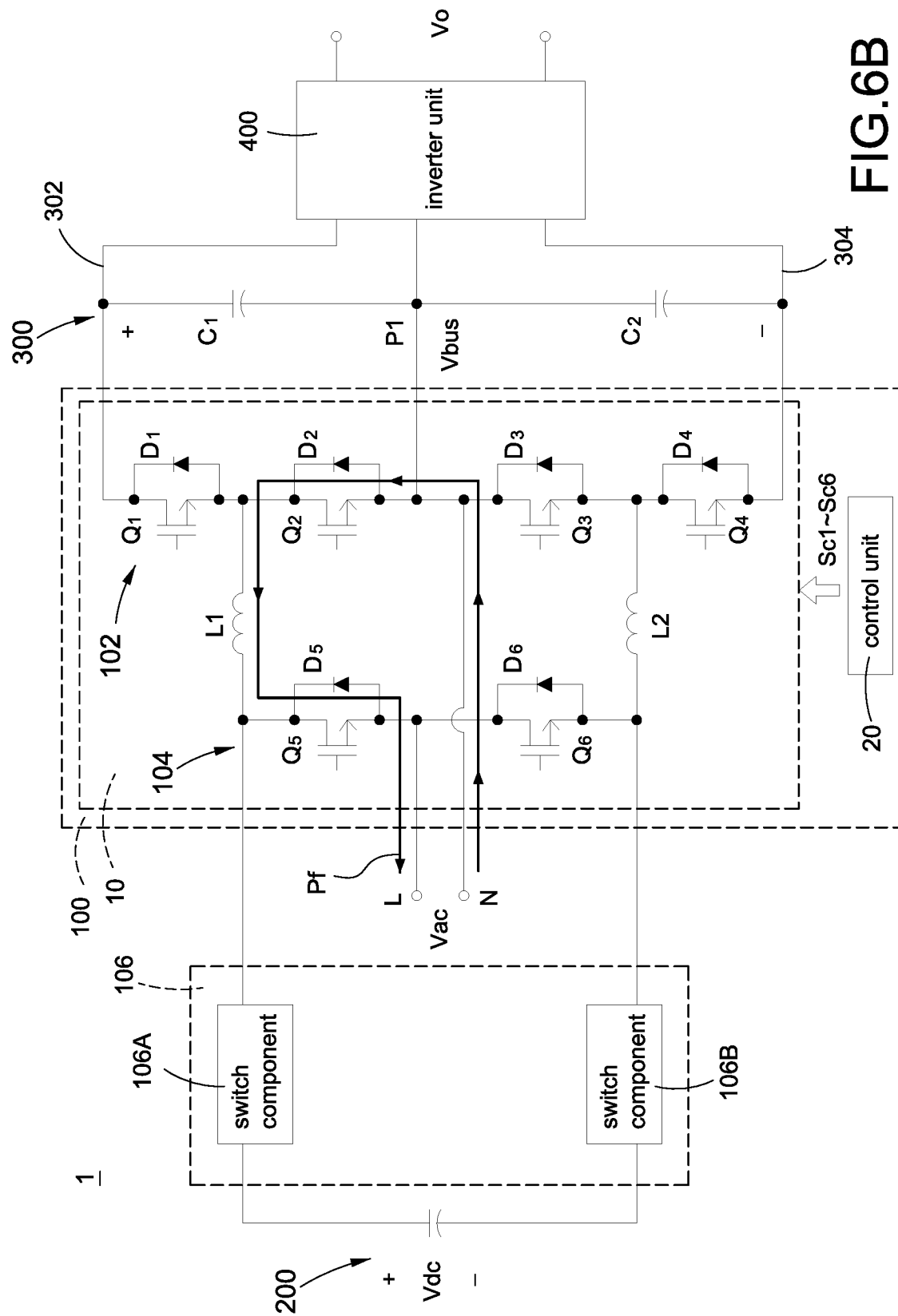
FIG. 6B shows a positive half cycle freewheeling path of operating the bidirectional PFC module in the power feed mode according to the present disclosure.
Figure 6C:
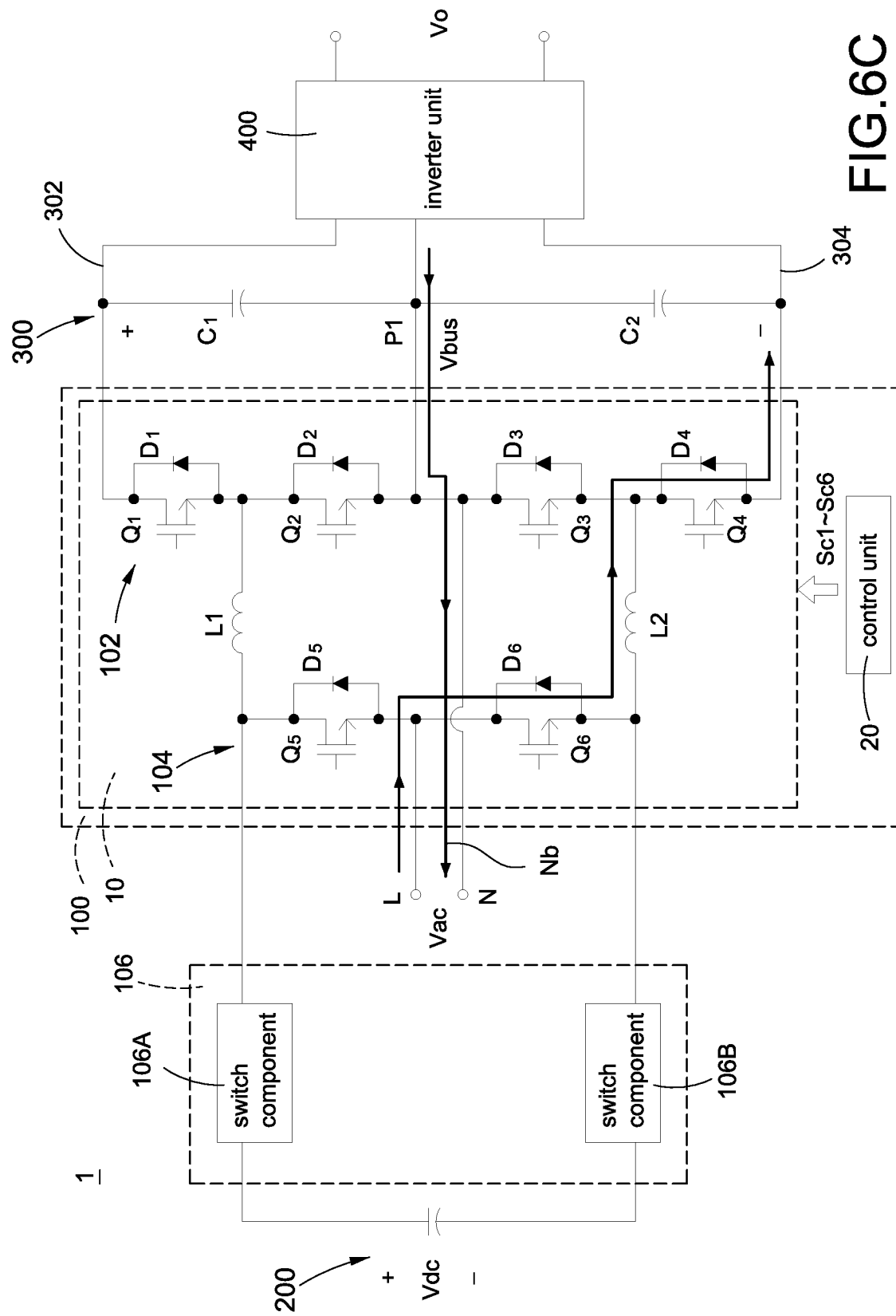
FIG. 6C shows a negative half cycle power feeding path of operating the bidirectional PFC module in the power feed mode according to the present disclosure.
Figure 6D:
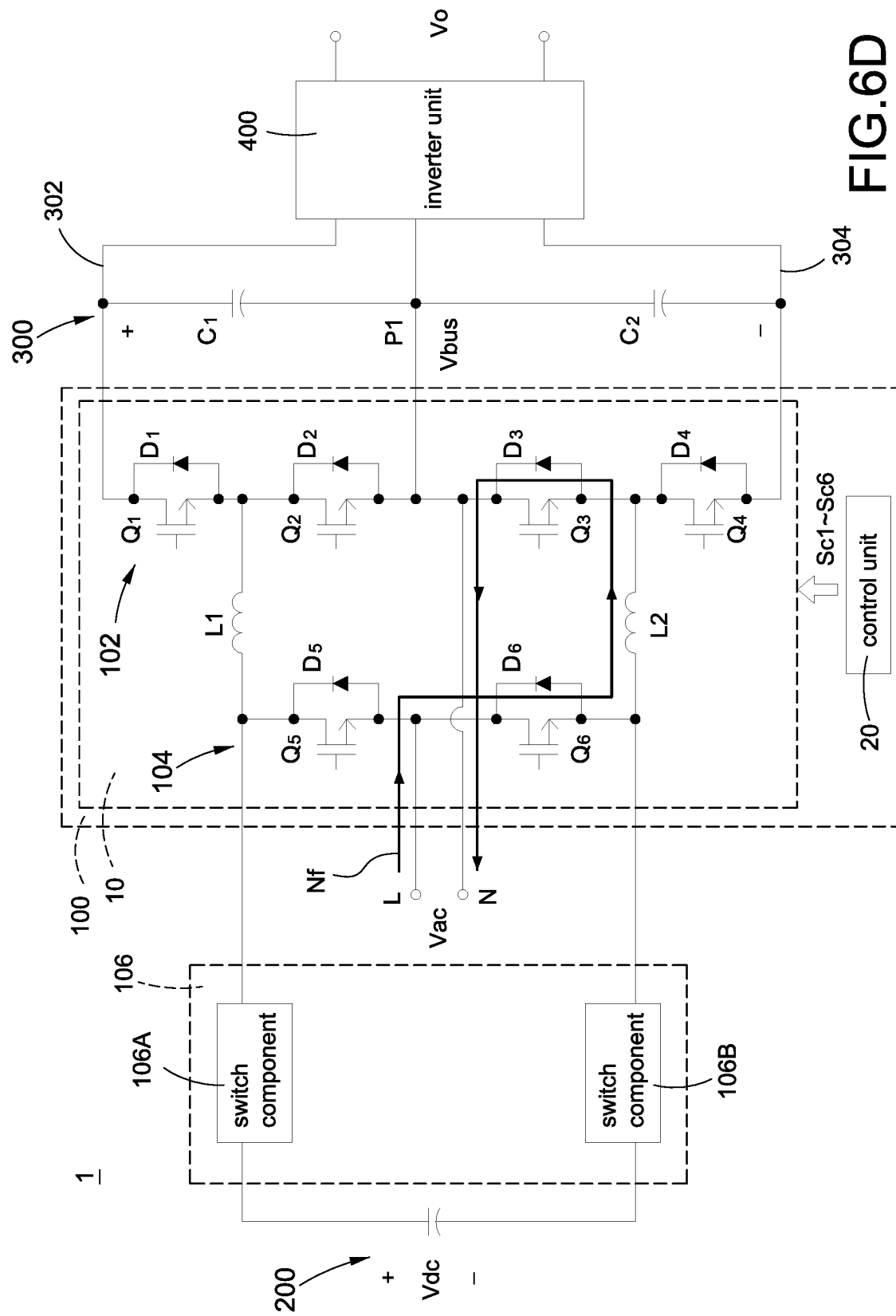
FIG. 6D shows a negative half cycle freewheeling path of operating the bidirectional PFC module in the power feed mode according to the present disclosure.

Please refer to FIGS. 6A and 6B, which show a positive half cycle power feeding path and a positive half cycle freewheeling path of operating the bidirectional PFC module in the power feed mode according to the present disclosure, respectively, and also refer to FIG. 2 to FIG. 5D. In FIG. 6A, a positive half cycle power feeding path Pb is formed through the first capacitor C1, the first switch assembly Q1, the first inductor L1, the fifth switch assembly Q5, the AC power source Vac, and the first capacitor C1. In FIG. 6B, a positive half cycle freewheeling path Pf is formed through the first inductor L1, the fifth switch assembly Q5, the AC power source Vac, the second switch assembly Q2 (or the bypass diode D2 of the second switch assembly Q2), and the first inductor L1. Please refer to FIG. 6C and FIG. 6D, which show a negative half cycle power feeding path and a negative half cycle freewheeling path of operating the bidirectional PFC module in the power feed mode according to the present disclosure, respectively, and also refer to FIG. 2 to FIG. 6B. In FIG. 6C and FIG. 6D, a negative half cycle power feeding path Nb and a negative half cycle freewheeling path Nf are formed, respectively. Since the negative half cycle power feeding path Nb and the negative half cycle freewheeling path Nf are similar to the positive half cycle power feeding path Pb and the positive half cycle freewheeling path Pf, the detail is omitted here for conciseness.

Figure 7A:
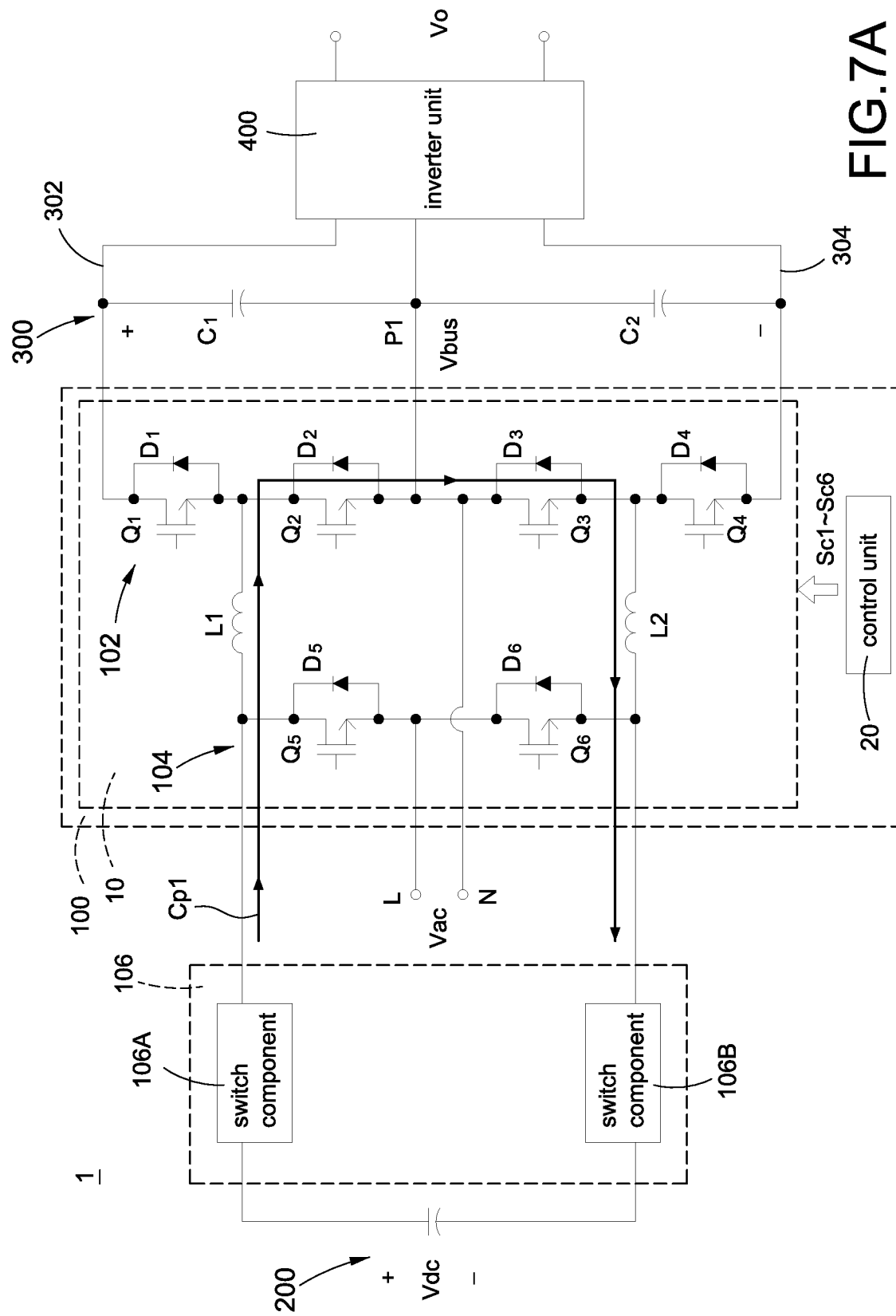
FIG. 7A shows a first charging path of operating the bidirectional PFC module in the DC power supply mode according to the present disclosure.
Figure 7B:
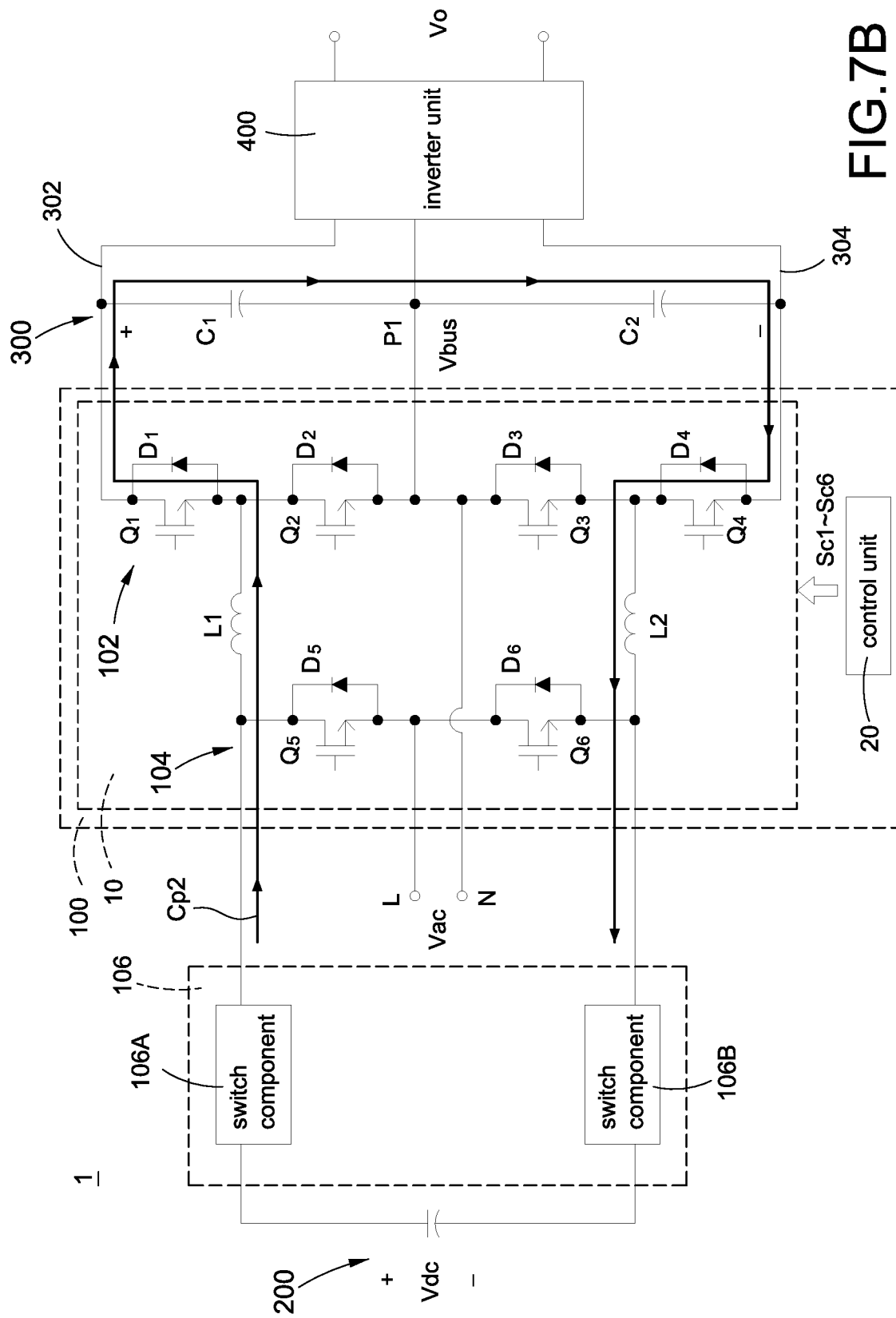
FIG. 7B shows a second charging path of operating the bidirectional PFC module in the DC power supply mode according to the present disclosure.

Please refer to FIGS. 7A and 7B, which shows a first charging path and a second charging path of operating the bidirectional PFC module in the DC power supply mode according to the present disclosure, respectively, and also refer to FIG. 2 to FIG. 6D. In FIG. 7A, a first charging path Cp1 is formed through the energy storage unit 200, the switch component 106A, the first inductor L1, the second switch assembly Q2, the third switch assembly Q3, the second inductor L2, the switch component 106B, and the energy storage unit 200. A second charging path Cp2 is formed through the energy storage unit 200, the switch component 106A, the first inductor L1, the first switch assembly Q1, the first capacitor C1, the second capacitor C2 (from the bus positive terminal 302 to the bus negative terminal 304), the fourth switch assembly Q4, the second inductor L2, the switch component 106B, and the energy storage unit 200. The main purpose and function of the present disclosure is to design a special circuit structure with a dual inductor disposed on the main current path of the bidirectional PFC module so that the energy storage unit no longer needs to be coupled with the bidirectional PFC through the DC-to-DC converter. Accordingly, it is to achieve significantly increasing in the power density of the circuit system, reducing the cost of the circuit, and reducing the size of the circuit.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A bidirectional power factor correction module coupled to an AC power source, an energy storage unit, and a DC bus, the DC bus having series-connected a first capacitor and a second capacitor, the bidirectional power factor correction module comprising:
   a bridge arm assembly comprising:
      a first bridge arm comprising series-connected a first switch assembly, a second switch assembly, a third switch assembly, and a fourth switch assembly; the first switch assembly coupled to the first capacitor, the fourth switch assembly coupled to the second capacitor, and the second switch assembly and the third switch assembly coupled to the AC power source, the first capacitor, and the second capacitor,
      a first inductor coupled to the first switch assembly and the second switch assembly,
      a second inductor coupled to the third switch assembly and the fourth switch assembly, and
      a second bridge arm comprising series-connected a fifth switch assembly and a sixth switch assembly; the AC power source coupled to the fifth switch assembly and the sixth switch assembly, the fifth switch assembly coupled to the first inductor and the energy storage unit, and the sixth switch assembly coupled to the second inductor and the energy storage unit, and
   a control unit configured to provide a plurality of control signals to control the bridge arm assembly so that the bridge arm assembly is operating in an AC power supply mode, a DC power supply mode, or a power feed mode.

2. The bidirectional power factor correction module in claim 1, wherein the AC power supply mode is that the AC power source is converted to a bus voltage through the bridge arm assembly; the DC power supply mode is that a DC power source provided by the energy storage unit is converted to the bus voltage through the bridge arm assembly; and the power feed mode is that the bus voltage is converted to the AC power source through the bridge arm assembly.

3. The bidirectional power factor correction module in claim 1, wherein in the AC power supply mode, a positive half cycle energy storage path is formed through the AC power source, the fifth switch assembly, the first inductor, the second switch assembly, and the AC power source; and a positive half cycle freewheeling path is formed through the AC power source, the fifth switch assembly, the first inductor, the first switch assembly, the first capacitor, and the AC power source.

4. The bidirectional power factor correction module in claim 1, wherein in the AC power supply mode, a negative half cycle energy storage path is formed through the AC power source, the third switch assembly, the second inductor, the sixth switch assembly, and the AC power source; and a negative half cycle freewheeling path is formed through the AC power source, the second capacitor, the fourth switch assembly, the second inductor, the sixth switch assembly, and the AC power source.

5. The bidirectional power factor correction module in claim 1, wherein in the DC power supply mode, a first charging path is formed through the energy storage unit, the first inductor, the second switch assembly, the third switch assembly, the second inductor, and the energy storage unit; and a second charging path is formed through the energy storage unit, the first inductor, the first switch assembly, the first capacitor, the second capacitor, the fourth switch assembly, the second inductor, and the energy storage unit.

6. The bidirectional power factor correction module in claim 1, wherein in the power feed mode, a positive half cycle power feeding path is formed through the first capacitor, the first switch assembly, the first inductor, the fifth switch assembly, the AC power source, and the first capacitor; and a positive half cycle freewheeling path is formed through the first inductor, the fifth switch assembly, the AC power source, the second switch assembly, and the first inductor.

7. The bidirectional power factor correction module in claim 1, wherein in the power feed mode, a negative half cycle power feeding path is formed through the second capacitor, the AC power source, the sixth switch assembly, the second inductor, the fourth switch assembly, and the second capacitor; and a negative half cycle freewheeling path is formed through the second inductor, the third switch assembly, the AC power source, the sixth switch assembly, and the second inductor.

8. The bidirectional power factor correction module in claim 1, further comprising:
a switch unit coupled to the energy storage unit, the fifth switch assembly, and the sixth switch assembly,
wherein in the AC power supply mode, the switch unit is turned off.

9. The bidirectional power factor correction module in claim 1, wherein the plurality of control signals comprises a first control signal for controlling the first switch assembly, a second control signal for controlling the second switch assembly, a third control signal for controlling the third switch assembly, a fourth control signal for controlling the fourth switch assembly, a fifth control signal for controlling the fifth switch assembly, and a sixth control signal for controlling the sixth switch assembly.

10. The bidirectional power factor correction module in claim 9, wherein in the AC power supply mode, when the AC power source is a positive half cycle, the second control signal is a first switching signal, the third control signal is a first level signal, the fourth control signal, the fifth control signal, the sixth control signal are second level signals; and when the AC power source is a negative half cycle, the third control signal is the first switching signal, the first control signal, the fifth control signal, the sixth control signal are the second level signals, the second control signal is the first level signal.

11. The bidirectional power factor correction module in claim 10, wherein when the AC power source is the positive half cycle, the first control signal and the second control signal are complementary or the first control signal is the second level signal; and when the AC power source is the negative half cycle, the fourth control signal and the third control signal are complementary or the fourth control signal is the second level signal.

12. The bidirectional power factor correction module in claim 9, wherein in the DC power supply mode, the first control signal and the second control signal are complementary first switching signals, the third control signal and the fourth control signal are complementary second switching signals, the fifth control signal and the sixth control signal are second level signals.

13. The bidirectional power factor correction module in claim 12, wherein the second control signal is the same as the third control signal.

14. The bidirectional power factor correction module in claim 9, wherein in the power feed mode, when the AC power source is a positive half cycle, the first control signal is a first switching signal, the third control signal and the fifth control signal are first level signals, the fourth control signal and the sixth control signal are second level signals; and when the AC power source is a negative half cycle, the fourth control signal is the first switching signal, the first control signal and the fifth control signal are the second level signals, the second control signal and the sixth control signal are the first level signals.

15. The bidirectional power factor correction module in claim 14, wherein when the AC power source is the positive half cycle, the second control signal and the first control signal are complementary or the second control signal is the second level signal; and when the AC power source is the negative half cycle, the third control signal and the fourth control signal are the complementary or the third control signal is the second level signal.

* * * * *